July 31, 1962 F. J. PILIA 3,047,715
GAS SHIELDED ARC WELDING TORCH
Filed May 20, 1959 2 Sheets-Sheet 2

INVENTOR.
FRANK J. PILIA
BY Richard S. Shreve
ATTORNEY

United States Patent Office 3,047,715
Patented July 31, 1962

3,047,715
GAS SHIELDED ARC WELDING TORCH
Frank J. Pilia, West Orange, N.J., assignor to Union Carbide Corporation, a corporation of New York
Filed May 20, 1959, Ser. No. 814,473
3 Claims. (Cl. 219—127)

This invention relates to gas shielded arc welding torches, and more particularly, to such torches for manual spot welding with a consumable electrode.

For the majority of normal inert gas shielded manual welding operations, it is eminently desirable to have a torch which is as light in weight and small in size as possible in order to keep operator fatigue to a minimum and torch maneuverability to a maximum. Conventional electric welding torches are designed primarily with this object in mind. For example, torch bodies and handles formed of plastic or other light weight insulating material are used which require no insulation to separate them from the current carrying torch members. The number of required torch parts is kept to a minimum and these parts are made as small and light as possible commensurate with the current carrying capacity required.

The increased applicability of the consumable electrode, spot welding process to the automobile industry, particularly in the assembly of automotive body components, has created the need for a torch designed primarily to withstand extremely rough handling and continuous heavy duty use. In this assembly-line type use, failure of the spot-welding torch in operation results in unwelded body components passing on beyond the welding station down the assembly line while torch repair or replacement is made. As a result, the use of the sigma spot welding process for this usage had been completely unsatisfactory prior to this invention due to the excessive torch maintenance required with the conventional torches. Standard conventional torches do not have the rugged construction necessary to continue in operation over long periods of time, despite the physical abuse to which it is subjected, without need for repair. In addition, the complexity of the standard torch assemblies do not lend themselves to rapid, in-position repair and replacement when failure of the torch occurs.

The main objects of the present invention are to avoid these disadvantages, and to provide a take-apart construction of the torch to facilitate repair and maintenance.

The torch of this invention combines the required rugged construction with an ease and rapidity of repair not to be found in the conventional electric welding torches. Basically, these factors are achieved according to the invention through the use of all-metal construction, a cartridge-type inner torch assembly, comprising the current carrying and electrode-contacting torch members, which can be withdrawn from the back end of the torch as a single sub-assembly, an electrical switching system, comprising the trigger, micro switch, cord strain relief and switch housing, made as a subassembly, and direct water-cooling of the gas cup to minimize downtime required to remove the extensive weld spatter from the gas cup inherent in sigma spot welding of mild steel.

Figure 1:
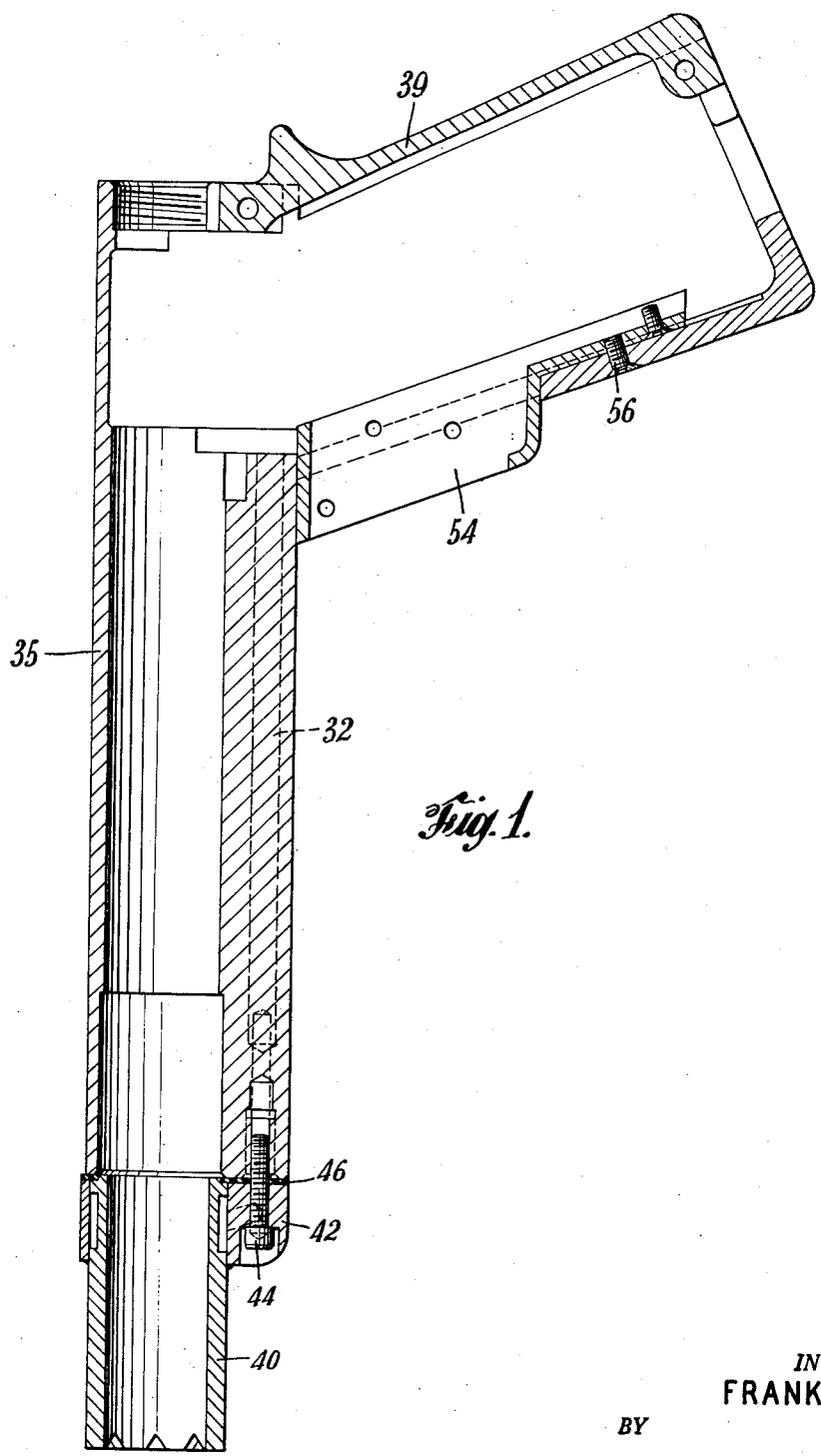
FIG. 1 is a section through the empty outer casing of the torch.
Figures 2, 3:
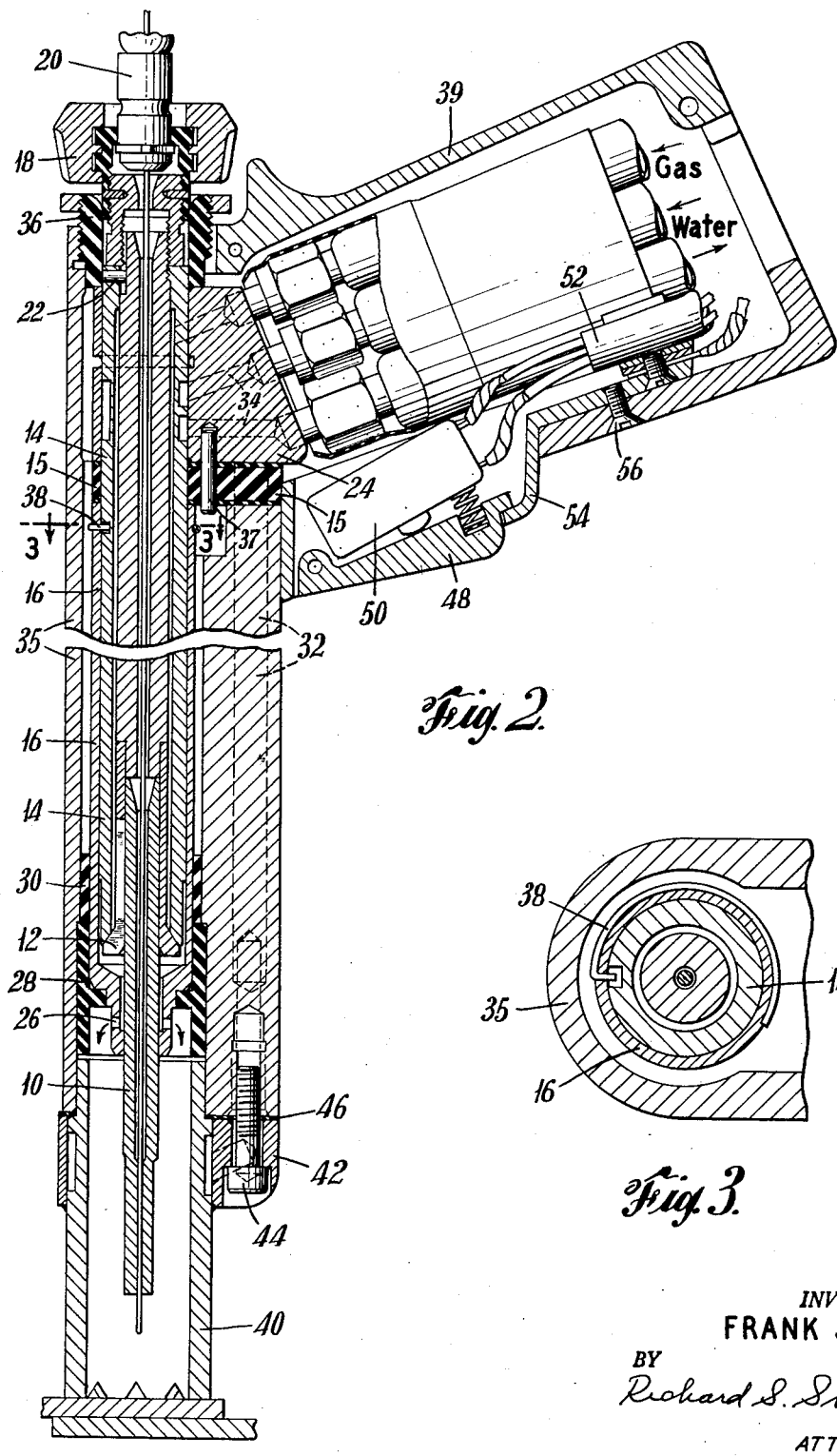
FIG. 2 is a similar view showing the insert or cartridge installed.
FIG. 3 is a section taken along line 3—3 of FIG. 2.

In the drawing, the inner torch sub-assembly comprises the electrode wire contact tube 10, collet 12, collet body assembly 14, sandwich insulator-gasket 15, and the collet body external jacket 16. Contact tube 10 is gripped by the fingers of the reverse-type collet 12. The loading of collet 12 in collet body assembly 14 is accomplished by means of collet release nut 18.

Collet release nut 18 serves a dual function in that it also provides a swivel connection for the flexible wire guide conduit 20, the nut being free to rotate about the end nipple on conduit 20. Pin 22 in the collet body assembly 14 fits into a key-hole slot in the back end of the collet 12 and prevents the collet from turning when the collet release nut 18 is screwed in to load the collet.

Collet body mounting block 24, which is brazed to the back end of the collet body to make the collet body assembly 14, contains the water in, water out, and shielding gas passages and hose connections. The collet body external jacket 16 is positioned around the front end of the collet body and for proper distribution of the shielding gas is provided with exit ports 26. The jacket 16 also provides a mounting surface for the insulator bushing 28 which provides radial support for the front end of the torch. Aligning bushing 30 serves to facilitate assembly of the torch.

Sandwich-type insulator-gasket assembly 15 provides an insulated compression seal between the dual water passages 34 in the current carrying mounting block 24 of collet body assembly 14 and corresponding passages 32 in the outer torch shell 35. Compression sealing of insulator-gasket 15 is accomplished by means of insulator nut 36 which, in addition axially positioning the inner torch assembly, provides longitudinal pressure for clamping insulator-gasket 15 between the torch outer shell 35 and the mounting block 24 of collet body assembly 14. Locating pin 37 in the collet body mounting block 24 provides angular alignment between the mounting block and the insulator-gasket sandwich assembly 15.

The use of the insulator nut 36 to provide the clamp pressure for water passage seals permits the withdrawal of the inner torch assembly from the back end of the torch as a single sub-assembly, which greatly facilitates repair or replacement of parts should this become necessary. Slip ring 38 makes the collet body external jacket 16 a part of the inner torch subassembly.

The outer torch body and handle shell 35 is a one-piece cast aluminum part, thus providing rigidity and strength to the torch assembly. Removable heel plate 39 exposes an opening which provides accessibility to the inner torch parts.

Very efficient direct water cooling of the gas cup 40 and torch body and handle 35 is accomplished by means of dual water passages 32 which extend from the mounting block 24, through the insulator-gasket sandwich assembly 15, and through the torch body shell 35 to the cup water jacket 42. One of these dual passages carries the water to the water jacket 42, the other carrying the water from the jacket. The cup water jacket 42 is assembled to the front end of the torch body shell 35 by means of screw 44, gasket 46 providing a seal against water leakage. The very effective water cooling of the shielding gas cup and front end of the torch achieved with this design has resulted in a marked decrease in the weld spatter adherence in this area. Extensive weld spatter has always been a problem with the sigma spot-welding of mild steel, and for the automotive assembly line application, interruptions in the welding operation for removal of weld spatter from the front end of the torch must be kept to a minimum, if not completely eliminated.

The electrical switching system, consisting of a trigger 48, micro switch 50, switch cord strain relief 52 and switch housing 54, comprises a sub-assembly which is simply and quickly removable from the torch handle, thereby facilitating electrical switching system maintenance and increasing the ruggedness of the torch.

Torch maintenance and repair are greatly simplified in this torch design through the use of the cartridge-type inner torch sub-assembly, as well as the electrical switching system sub-assembly. Both of these sub-assemblies are made readily accessible for repair or replacement by removing the collet release nut 18, heel plate 39, and insulator nut 36. The inner torch sub-assembly can then be slipped out of the back end of the torch shell. Removal of screw 56 allows the switching assembly to be similarly removed.

Performance tests to date in actual production operation have indicated that the torch of this invention has an operating life expectancy of a minimum of 10 times that of the commercially available sigma spot welding torches, of our own or competitive designs, before repair of replacement of parts becomes necessary.

The operation of the torch for spot welding is in accordance with the teachings of the Essig Patent 2,776,361. The torch nozzle is pressed against the work to be spot welded and the spot welding cycle initiated by actuating trigger 48 which is electrically connected to the welding controls. The shielding gas flows down through the annular passage between collet 12 and collet body 14, through the ports 26 in the collet body external jacket 16, to the gas nozzle 40. Welding current passes to the consumable electrode from the power cable through the collet body assembly 14, collet 12, and wire contact tube 10. The consumable electrode wire is supplied to the torch through the flexible wire guide conduit 20.

What is claimed is:

1. In a gas shielded arc welding torch, an outer shell comprising a barrel with a gas directing nozzle at the front of said barrel and a pistol grip at the rear of said barrel having an access opening in the back thereof; and an insert comprising an electrode holder tube adapted to receive an electrode contactor, said tube having an outer diameter to slide into the rear of said barrel while carrying the contactor on through said barrel to extend into said nozzle at the front thereof; said insert having a gas passage for supplying shielding gas to said nozzle, said insert having supply conduits secured thereto and extending laterally therefrom for supplying shielding gas to said insert passage and welding current to said contacting means, said conduits being slidable through said access opening into said pistol grip as said tube slides into said barrel.

2. In a gas shielded arc welding torch an outer shell comprising a barrel with a gas directing nozzle at the front of said barrel and a pistol grip at the rear of said barrel having an access opening in the back thereof; and an insert comprising a tube slidable into said barrel carrying an electrode contactor and having a gas passage for supplying shielding gas to said nozzle, said insert having supply conduits secured thereto for supplying shielding gas to said insert passage and welding current to said contactor, an insulator nut for axially positioning said insert in said barrel, in which said nozzle has a cooling jacket, said shell has a cooling passage under said barrel leading to said jacket, said insert has a liquid inlet registering with said shell passage and a supply conduit extending laterally from said tube, and a gasket between said insert and said shell under clamp pressure by said insulator nut for sealing said inlet in register with said passage as said liquid conduit passes through said access opening into said pistol grip.

3. In a gas shielded arc welding torch an outer shell comprising a barrel with a gas directing nozzle at the front of said barrel and a pistol grip at the rear of said barrel having an access opening in the back thereof; and an insert comprising a tube slidable into said barrel carrying an electrode contactor and having a passage for supplying shielding gas to said nozzle, said insert having supply conduits secured thereto and extending laterally therefrom for supplying shielding gas to said insert passage and welding current to said contactor, in which said electrode contactor means is a wire guide tube held in said insert by a collet and nut, said collet nut has a swivel connection to a flexible wire supply conduit, said insert tube is held in said barrel by an insulator nut concentric with said guide tube and screwed into said barrel, a removable heel plate is secured to the rear of said pistol grip to close a part of said opening therein, and the remainder of said opening is closed by said insulator nut.

References Cited in the file of this patent

UNITED STATES PATENTS

| 2,358,158 | Gibbert | Sept. 12, 1944 |
| 2,360,160 | Pickhaver | Oct. 10, 1944 |
| 2,361,896 | Yeadon | Oct. 31, 1944 |
| 2,490,593 | Kay | Dec. 6, 1949 |
| 2,727,970 | Turbett | Dec. 20, 1955 |
| 2,754,395 | Scheller et al. | July 10, 1956 |
| 2,903,567 | Piekarski et al. | Sept. 8, 1959 |

FOREIGN PATENTS

| 662,806 | Great Britain | Dec. 12, 1951 |